United States Patent Office 3,366,607
Patented Jan. 30, 1968

3,366,607
PREPARATION OF POLYPEPTIDES
Mary E. Carter, Philadelphia, and Otto K. Carlson, Marcus Hook, Pa., assignors to FMC Corporation, Philadelphia, Pa., a corporation of Delaware
No Drawing. Continuation-in-part of application Ser. No. 191,270, Apr. 30, 1962. This application Mar. 11, 1965, Ser. No. 439,093
7 Claims. (Cl. 260—78)

ABSTRACT OF THE DISCLOSURE

A method for the preparation of high molecular weight polypeptides, particularly polymers of esters of alpha-amino acids, is disclosed herein.

---

This is a continuation-in-part of copending application Ser. No. 191,270, filed Apr. 30, 1962, now abandoned.

Polymers and copolymers of alpha-amino acids are useful in the manufacture of filaments and films. These polymers, termed polypeptides, have been prepared by several different methods. In general, such methods are time consuming and result in low polymerization rates.

It is an object of this invention to provide a method for the preparation of polypeptides from alpha-amino acid esters.

It is another object of this invention to provide a method for the preparation of high molecular weight polypeptides at relatively high yields.

It is still another object of this invention to provide a method for the rapid polymerization of alpha-amino acid esters to obtain high molecular weight polypeptides.

These and other objects are accomplished in accordance with the method of this invention which comprises heating an alpha-amino acid ester in an inert atmosphere in the presence of an aluminum alkoxy catalyst.

The term inert atmosphere as used herein includes inert liquids and gaseous media, for example, nitrogen, helium, argon, o-dichlorobenzene, nitrobenzene, benzene, ethylene dichloride, chloroform, dioxane, dimethyl formamide, etc.

The alpha-amino acid esters include, for example, lower alkyl esters of glycine, alanine, valine, leucine, norleucine, isoleucine, phenylalanine, serine, tyrosine, and thyroxine. Dextrorotatory, laevorotatory and/or racemic forms of the amino acids may be used. However, the racemic or dl form is preferred on the basis of cost and availability. The lower alkyl esters of the amino acids are quite unstable under normal storage conditions and form various condensation products on standing for as short a period as twelve hours. Therefore, the monomers were obtained and stored as their corresponding stable hydrochloride salts. In general, the free esters were obtained by neutralizing ether mixtures of the hydrochloride salt with either sodium hydroxide or gaseous ammonia, separating the ether-amino ester solution and evaporating the ether. The use of gaseous ammonia to neutralize the hydrochloride salt and a rotary evaporation technique was the preferred method for the preparation of the free esters since this method produced a very pure product and it was found that the purer the free ester, the more stable it became.

The catalysts for this invention are the aluminum alkoxide having the general formula:

wherein X is a halogen, preferably chlorine, or OR, and R is an alkyl radical having from 1 to 20 carbon atoms, preferably from 1 to 10 carbon atoms. Examples of some of the more available catalysts include aluminum triethoxide, aluminum triisopropoxide, aluminum chlorodiisopropoxide, aluminum dichloroisopropoxide, aluminum tributoxide and the like. The amount of catalyst employed in the method of this invention based on the amount of ester reactant ranges from at least .1% by weight up to about 10% by weight. An amount of catalyst ranging from .5 to 5% based on the weight of the reactants is preferably employed.

While the polymerization reaction is generally carried out at atmospheric pressure it may be carried out in a pressurized reaction vessel at pressures of 100 to 400 atmospheres and higher.

Reaction temperature for the preparation of the high molecular weight polypeptides in general range from about 50 to about 200° C. and preferably from about 90 to 150° C. The reaction period is from about one-half hour to twenty-four hours and preferably 1 to 6 hours depending on the other reaction conditions.

The following examples demonstrate the methods of this invention.

EXAMPLE I

*Preparation of ethyl glycinate*

One hundred g. of ethyl glycinate hydrochloride was suspended in 200 ml. of dry ether in a 500 ml., 3 neck, round bottom flask fitted with a Dry Ice condenser, a gas inlet tube and a mechanical stirrer. The mixture was cooled to 0° C. while stirring and treated with a slow stream of dry gaseous ammonia under anhydrous conditions. A large excess and rapid stream of ammonia was avoided to prevent loss of ester by volatilization.

After filtering off the ammonium chloride formed, the ether solution was concentrated in a rotary flash evaporator at reduced pressure. The residue was then heated to 60° C. and distilled under vacuum into the rotary flash evaporator trap which was cooled by means of a Dry Ice-acetone bath. The distilled material was allowed to freeze in the trap while rotating slowly for 1½ hours before releasing the vacuum and bleeding in nitrogen.

After warming to room temperature under nitrogen the free ethyl glycinate (98% yield) was placed in vaccine bottles and stored in Dry Ice until used.

*Bulk polymerization of ethyl glycinate*

Under nitrogen, 10 ml. of the previously prepared ethyl glycinate was pipetted into a 60 cc. distillation flask with a side arm, and a small quartz boiling chip was added. 0.3 ml. of aluminum isopropoxide was introduced into the distillation flask by means of a hypodermic syringe and needle. The reaction mass was then heated to a temperature ranging between 140 and 162° C. for 46 minutes. Ethanol, which was distilled off during the reaction period, was collected and measured in a water-jacketed receiver.

At the completion of the polymerization the vessel was allowed to cool under nitrogen and the distillation flask was broken in order to remove the solid polymer. The polymer was washed and blended with ethanol in a mechanical blendor and then air- and oven-dried in vacuo. The polyethyl glycinate weighed 4.1 g. which indicated a yield in mol percent of 72.

EXAMPLE II

*Solution polymerization of ethyl glycinate*

Ten ml. of ethyl glycinate prepared in accordance with the method of Example I and 25 ml. of o-dichlorobenzene were pipetted into a 75 ml. reaction vessel with stirring. The reaction vessel was kept in an oil bath at a temperature maintained at 100° C. and a nitrogen atmosphere was maintained within the reaction vessel from the beginning to the end of the experiment. The reaction solution was allowed to come to equilibrium with the bath temperature and then the catalyst, 2 ml. of aluminum isopropoxide, was injected into the reaction vessel with a hypodermic syringe. The ethanol which distilled off during the reaction period of 24 hours was collected in a 15 ml. capacity water-jacketed receiver.

At the completion of the polymerization the bath was removed and the reaction vessel allowed to cool under nitrogen. Ethanol was then added to the vessel, the resulting mixture slurried and then centrifuged. The polymer was washed with four 200 ml. portions of ethanol and then air- and oven-dried in vacuo. The polymer yield was 3.51 g. or 61.4 mol percent. The polymer had an intrinsic viscosity D.C.A. (dichloroacetic acid *) of 0.120.

EXAMPLE III

*Solution polymerization of ethyl glycinate*

Seventy-five ml. of ethyl glycinate prepared in accordance with the method of Example I and 100 ml. of o-dichlorobenzene were pipetted into a 500 ml. reaction vessel with stirring. The reaction vessel was kept in an oil bath with a temperature maintained at from 95 to 136° C. A nitrogen atmosphere was maintained within the reaction vessel from the beginning to the end of the polymerization reaction. The reaction solution was allowed to come to equilibrium with the bath temperature and then the catalyst, 1.8 ml. of aluminum isopropoxide, was injected into the reaction vessel with a hypodermic syringe. The ethanol which distilled off during the reaction period of 5.5 hours was collected in a 15 ml. capacity water-jacketed receiver.

At the completion of the polymerization the bath was removed and the reaction vessel allowed to cool under nitrogen. Ethanol was then added to the vessel and the resulting mixture slurried, and then centrifuged. The polymer was washed with four 200 ml. portions of ethanol, then air- and oven-dried in vacuo. The polymer yield was 14.3 g. or 33.4 mol percent. The polymer had an intrinsic viscosity D.C.A. of 0.120.

EXAMPLE IV

*Solution polymerization of ethyl glycinate*

Twenty-five ml. of ethyl glycinate prepared in accordance with the method of Example I and 28.2 ml. of o-dichlorobenzene were pipetted into a 75 ml. reaction vessel with stirring. The reaction vessel was kept in an oil bath with a temperature maintained at 100° C., and a nitrogen atmosphere was maintained within the reaction vessel from the beginning to the end of the procedure. The reaction solution was allowed to come to equilibrium with the bath temperature and then the catalyst consisting of 0.45 g. of aluminum chloroisopropoxide dissolved in 1 ml. of o-dichlorobenzene was injected into the reaction vessel with a hypodermic syringe. The ethanol which distilled off during the reaction period of 5 hours collected in a 15 ml. capacity water-jacketed receiver.

At the completion of the polymerization the bath was removed and the reaction vessel allowed to cool under nitrogen. Ethanol was added to the vessel and the resulting mixture slurried, and then centrifuged. The polymer was washed with four 200 ml. portions of ethanol and then air- and oven-dried in vacuo. The polymer yield was 3.14 g. or 22 mol percent.

EXAMPLE V

*Preparation of ethyl phenylalaninate hydrochloride*

1100 m. of concentrated hydrochloric acid was added to a solution which contained 110 g. of phenylalanine in 500 ml. of water and the entire solution refluxed for 1 hour. This solution was taken to dryness at reduced pressure in a rotary flash evaporator. Benzene was added to remove traces of water and then removed by distillation.

The crude hydrochloride salt weighing 1400 g. was dissolved in the smallest possible amount of water (about 25 ml.) and this solution was added to a mixture of 800 ml. absolute ethanol and 600 ml. of benzene. The mixture was then refluxed for 144 hours divided into eighteen 8 hour periods. During each of these 8 hour periods approximately 800 ml. of the bottom layer of the refluxing mixture was collected. During the course of the reaction 3 additions were made of a solution of 300 ml. of benzene and 400 ml. of ethanol.

When the reflux temperature reached 68° C. indicating an ethanol/benzene azeotrope, 800 ml. of ethanol was added to remove the excess benzene. The distillation was continued until most of the ethanol had been removed. The greenish viscous liquid was transferred to a 2 liter 1 neck round bottom flask and evaporated to dryness. The resulting fine metal-like hydroscopic crystals were washed several times with ether and then stored in a vacuum desiccator under calcium chloride.

The free ester of ethyl phenylalanine was obtained from its hydrochloride salt using the same procedure described in Example I for obtaining ethyl glycinate from its corresponding hydrochloride salt.

*Bulk polymerization of ethyl phenylalaninates*

Under nitrogen, 10 ml. of the previously prepared ethyl phenylalaninate was pipetted into a 60 cc. distillation flask with a side arm, and a small quartz boiling chip was added. 0.3 ml. of aluminum isopropoxide was introduced into the distillation flask by means of a hypodermic syringe and needle. The reaction mass was then heated at a temperature ranging between 160 and 200° C. for 1 hour. Ethanol, which was distilled off during the reaction period, was collected and measured in a water-jacketed receiver.

At the completion of the polymerization the vessel was allowed to cool under nitrogen. The polymer was washed and blended with ethanol in a mechanical blendor and then air- and oven-dried in vacuo. The polyphenylalanine weighed 5.7 g. which indicated a yield in mol percent of 66.3.

EXAMPLE VI

*Bulk polymerization of ethyl alaninate*

The monomer, ethyl alaninate, was prepared in the manner set forth for the preparation of ethyl phenylalaninate in Example V.

Under nitrogen, 10 ml. of the previously prepared ethyl alaninate was piped into a 60 cc. distillation flask with a side arm, and a small quartz boiling chip was added. 1.9 ml. of a 1.03 molar solution of aluminum isopropoxide in o-dichlorobenzene was introduced into the distillation flask by means of a hypodermic syringe and needle. The reaction mass was then heated at a temperature ranging between 112 and 130° C. for 5.5 hours. Ethanol, which was distilled off during the reaction period, was collected and measured in a water-jacketed receiver.

At the completion of the polymerization the vessel was allowed to cool under nitrogen and the distillation flask was broken in order to remove the solid polymer. The polymer was washed and blended with ethanol in a mechanical blendor and then air- and oven-dried in vacuo. The polyalanine weighed 2.8 g. which indicated a yield in mol percent of 46.9.

EXAMPLE VII

A glass liner was charged with 20 ml. of ethyl glycinate and 1 ml. of aluminum isopropoxide under nitrogen and sealed. A liner was then placed in a bomb fitted with a pressure gauge, a thermocouple and a pressure valve. The bomb was mounted on a rocker assembly and a nitrogen line connected to the pressure valve. Nitrogen at a pressure of 500 p.s.i.g. was introduced into the bomb and the valve closed. The pressure was then released by bleed-

---

* Used as a solvent in standard method of determining polymer viscosity.

ing off slowly through the pressure gauge connection. This procedure was performed several times before finally pressurizing the bomb with 200 p.s.i.g. of nitrogen and then closing the system. The nitrogen line was disconnected and the rocking action started. Heat was applied and the reaction was continued for 3 hours after the temperature in the bomb reached a range of 150 to 182° C.

At the completion of the polymerization, heating was discontinued and the bomb removed from the rocker assembly and allowed to cool to room temperature before releasing the pressure and removing the glass liner from the bomb.

The reaction product was then washed and beaker extracted with 500 ml. portions of hot water, filtered by suction and air-dried.

The resulting polyglycine weighed 3.75 g. which indicated a yield of 33.8 mol. percent. This polymer had an intrinsic viscosity D.C.A. at 30° C. of 0.176 indicating a molecular weight of well over 5000.

Various changes and modifications may be made practicing the invention without departing from the spirit and scope thereof and, therefore, the invention is not to be limited except as defined in the appended claims.

We claim:

1. A method for the preparation of a polypeptide from an alpha-monoamino monocarboxylic acid lower alkyl ester which consists essentially of heating said ester at a temperature of between about 50 and about 200° C. in an inert atmosphere in the presence of an aluminum alkoxy catalyst having the general formula

wherein X is selected from the group consisting of a halogen and OR, and R is an alkyl radical having from 1 to 20 carbon atoms.

2. The method of claim 1 wherein the halogen of the aluminum alkoxy catalyst is chlorine and the alkyl radical has from 1 to 10 carbon atoms.

3. The method of claim 1 wherein the ester is heated to a temperature ranging from about 90 to about 150° C. for a reaction period of about ½ hour to about 24 hours.

4. A method for the preparation of a polypeptide from an alpha-monoamino monocarboxylic acid lower alkyl ester which consists essentially of heating said ester in an inert atmosphere to a temperature ranging between about 90 and about 150° C. in the presence of aluminum triisopropoxide for a reaction period of from about 1 to 6 hours.

5. The method of claim 4 wherein the ester is ethyl glycinate.

6. The method of claim 4 wherein the ester is ethyl alaninate.

7. The method of claim 4 wherein the ester is ethyl phenylalaninate.

References Cited
UNITED STATES PATENTS

| | | | |
|---|---|---|---|
| 2,657,972 | 11/1953 | Woodward | 260—78 |
| 2,904,538 | 7/1959 | Gaertner et al. | 260—78 |

FOREIGN PATENTS

| | | |
|---|---|---|
| 852,914 | 11/1960 | Great Britain. |

WILLIAM H. SHORT, *Primary Examiner.*

H. D. ANDERSON, *Assistant Examiner.*